United States Patent [19]

Vollmer et al.

[11] Patent Number: 4,795,189
[45] Date of Patent: Jan. 3, 1989

[54] SAFETY SYSTEM FOR AUTOMOTIVE VEHICLES

[75] Inventors: Elmar Vollmer, Wettstetten; Helmut Adam, Ingolstadt; Werner Wilhelm, Altmannstein-Pondorf, all of Fed. Rep. of Germany

[73] Assignee: Audi AG., Ingolstadt, Fed. Rep. of Germany

[21] Appl. No.: 83,256

[22] Filed: Aug. 6, 1987

[30] Foreign Application Priority Data

Aug. 14, 1986 [DE] Fed. Rep. of Germany ....... 3627558

[51] Int. Cl.$^4$ ............................................. B60R 22/46
[52] U.S. Cl. .................................... 280/801; 180/274; 280/750
[58] Field of Search ................ 180/232, 274; 280/750, 280/801, 806

[56] References Cited

U.S. PATENT DOCUMENTS 3,981,520  9/1976  Pulling ................................. 180/274
4,411,334  10/1983  Schlanger ........................... 180/232

FOREIGN PATENT DOCUMENTS 40667     8/1929  Denmark ............................. 180/274
171580    2/1986  European Pat. Off. ............ 280/801
8501709   4/1985  PCT Int'l Appl. .................. 280/750
2160411  12/1985  United Kingdom ................ 280/801

Primary Examiner—David M. Mitchell
Assistant Examiner—Ross Weaver
Attorney, Agent, or Firm—Karl Hormann

[57] ABSTRACT

An impact activated automotive safety system relying upon relative movement between a drive unit and a chassis of an automobile and comprising a plurality of cables attached, at one of their ends, to the chassis on opposite sides, and slung around a rear portion, of the drive unit and respectively attached by their other ends to a plurality of safety features such as, for instance, a collapsible steering column, seatbelt coiling devices, and seat-lifting mechanisms, all of which would be activated substantially simultaneously in case of a frontal collision by forces transmitted to them by the cables.

17 Claims, 2 Drawing Sheets

SAFETY SYSTEM FOR AUTOMOTIVE VEHICLES

REFERENCE TO RELATES APPLICATIONS.

The present application discloses subject matter generally related to that of co-pending applications, Ser. Nos. 745,770 filed June 13, 1985 now U.S. Pat. No. 4,703,827 issued Nov. 3, 1987, Ser. No. 749,532 filed June 13, 1985, and Ser. No. 17,819 filed Feb. 24, 1987.

FIELD OF THE INVENTION.

The invention in general relates to an automotive safety system. More specifically, the invention relates to a safety system of the kind useful for the protection of passengers in an automobile from the adverse effects of a frontal collision, by converting, by way of flexible but relative inextensible means, relative movement between a front mounted drive unit and predetermined components of a chassis, resulting from such a collision, into movement of a plurality of safety features into their operative positions and/or conditions.

THE STATE OF THE ART.

U.S. application Ser. No. 749,532 filed June 13, 1987, discloses an automotive safety system of the general kind here under consideration. The prior art system relates to an automotive vehicle equipped with a front-mounted drive unit comprising an engine and a transmission, and apparatus for utilizing impact energy for activating a safety device for protecting passengers in the vehicle. By drawing upon the relative movement occurring, during a frontal collision, between the chassis of the vehicle and the drive unit, the safety device is put into its operative position or condition. The apparatus includes substantially flexible but unstretchable means, such as, for instance, a cable, the ends of which are respectively connected to the drive unit and the safety feature, and which is provided with a motion reversing device. Thus, the reduction in space between the drive unit and a component of the chassis provided outside of the area which in a frontal collision exceeding a predetermined magnitude is subject to collapse or compression, is translated into movement or activation of the safety device.

To activate the safety device in this manner, or by these means, offers certain inherent advantages. One of them is that by utilizing the drive unit as the release or initiating mechanism the system is activated for protecting passengers in the vehicle only in case of a frontal collision exceeding a predetermined magnitude. This, or course, is a sensible measure, as it substantially avoids any unintentional activation of the safety device and the resulting necessity of restoring the system to its operable condition. Using a cable for transmitting the force or energy keeps the structural requirements or, in case of a later installation, adaptations at a minimum and is highly efficient and cost effective. Moreover, a cable may be installed with practically no structural constraints and, in contrast to hydraulic or pneumatic systems, offers significantly higher functional reliability.

OBJECTS OF THE INVENTION

It is, therefore, a primary object of the present invention to provide for an improved impact activated safety system for automotive vehicles.

A more specific object of the invention resides in the provision of an automotive safety system of the kind referred to in which otherwise individual elements are integrated into a functional, cost-efficient and symbiotic system.

Furthermore, it is an object of the invention to provide an impact activated safety system arranged in such a manner that kinematic conditions such as forces, moments, and eccellerations are utilized in an optimum fashion and, to the extent possible, without sacrificing its effectiveness, in a manner preserving structural components.

An important object of the invention resides also in the provision of an impact force activated automotive safety system which couples a plurality of safety apparatus to a common initiator.

Other objects of the invention will in part be obvious and will in part appear hereinafter. The invention accordingly comprises a mechanism and system possessing the construction, combination of elements and arrangements of parts which are exemplified in the detailed disclosure.

SUMMARY OF THE INVENTION.

In the accomplishment of these and other objects, the invention, in a preferred embodiment thereof, comprises an automotive safety system for protecting passengers in a frontal collision, comprising safety apparatus including means activatable by substantially flexible and unstretchable means for converting the relative movement between a front-mounted drive unit and predetermined components of the chassis into movement of the safety apparatus into its operative position or condition. Preferably, as seen in the direction of vehicular forward movement, there may be provided, on each side of the drive unit, first guide means and mounting means for securing and for reversing the direction of a plurality of cables. In the vicinity of the drive unit, the cables, each of which may be coupled to a different one of a plurality of safety features, may preferably be arranged to run in parallel to each other, as in a harness, at least partially embracing the drive unit and, at a rearward portion thereof, being guided and retained by second guide means.

In a further advantageous embodiment, the harness comprises at least first, second and third cables, the first cable being connected to a steering column and the second and third cables being connected to coiling means of seatbelts associated with first and second passenger seats.

In an especially advantageous embodiment of the invention the seatbelts may be of the lap and shoulder type being secured at three points, including a coiling reel, and the second and third cables may be coupled to the seatbelts, for instance by way of the coiling reels, in a manner affecting at least their lap and shoulder portions.

Advantageously, seatbelts of further passenger seats may be coupled to the second and third cables, means being provided on opposite sides of the vehicle for providing connections from the second and third cables to the seatbelts of such further seats.

Moreover, and in a further advantageous embodiment of the invention, the safety system may comprise passenger seats which in case of a frontal collision may be drawn by the cables into an elevated or backwardly tilted position.

In accordance with one embodiment of the invention the substantially flexible and unstretchable means connecting the safety apparatus to the guide and mounting means may comprise bowden cables running in alternate directions, respectively extending from the right and left side of the vehicle to the left and right side of the drive unit. The guide and mounting means on the one side of the drive unit may comprise a guide rail or motion reversing means for the cable connected to the steering column, a mounting bracket for the cable partially guided in the sleeve on the opposite side of the vehicle, and a sleeve terminal for the bowden cable on the one side. The guide and mounting means on the opposite side of the drive unit may comprise mounting brackets for the steering column cable as well as for the cowden cable partially guided in a sleeve on the one side of the vehicle, and a sleeve terminal for the bowden cable on the opposite side of the vehicle.

Advantageously, the bowden cables may at least in part be mounted in the rocker panels of a chassis.

In a further advantageous embodiment each coiling means of the seatbelts may be provided with rigidly and coaxially connected reel means for coiling a cable.

In a further embodiment, the cable for affecting the steering column may be connected to a mounting bracket of the steering column and the steering column may comprise a collapsible section.

DESCRIPTION OF THE DRAWINGS

The novel features which are deemded to be characteristic of the invention are set forth with particularity in the appended claims. The invention itself, however, in respect of its organization as well as its method of operation, together with other objects and advantages thereof, will be best understood from the following description of illustrative embodiments when read in connection with the accompanying drawings, in which:

FIG. 1 schematically depicts the forward section of an automotive vehicle 1 in planar view. A gear box or transmission 2 is shown as part of a drive unit. A cable 5 is connected to a steering column 4 provided with a steering wheel 3. As is well-known from the prior art, in case of movement (arrow 6) of the transmission 2 as a result of a collision, the cable 5 may withdraw the steering wheel 3 from a site of potential danger to the driver.

Figure 1:
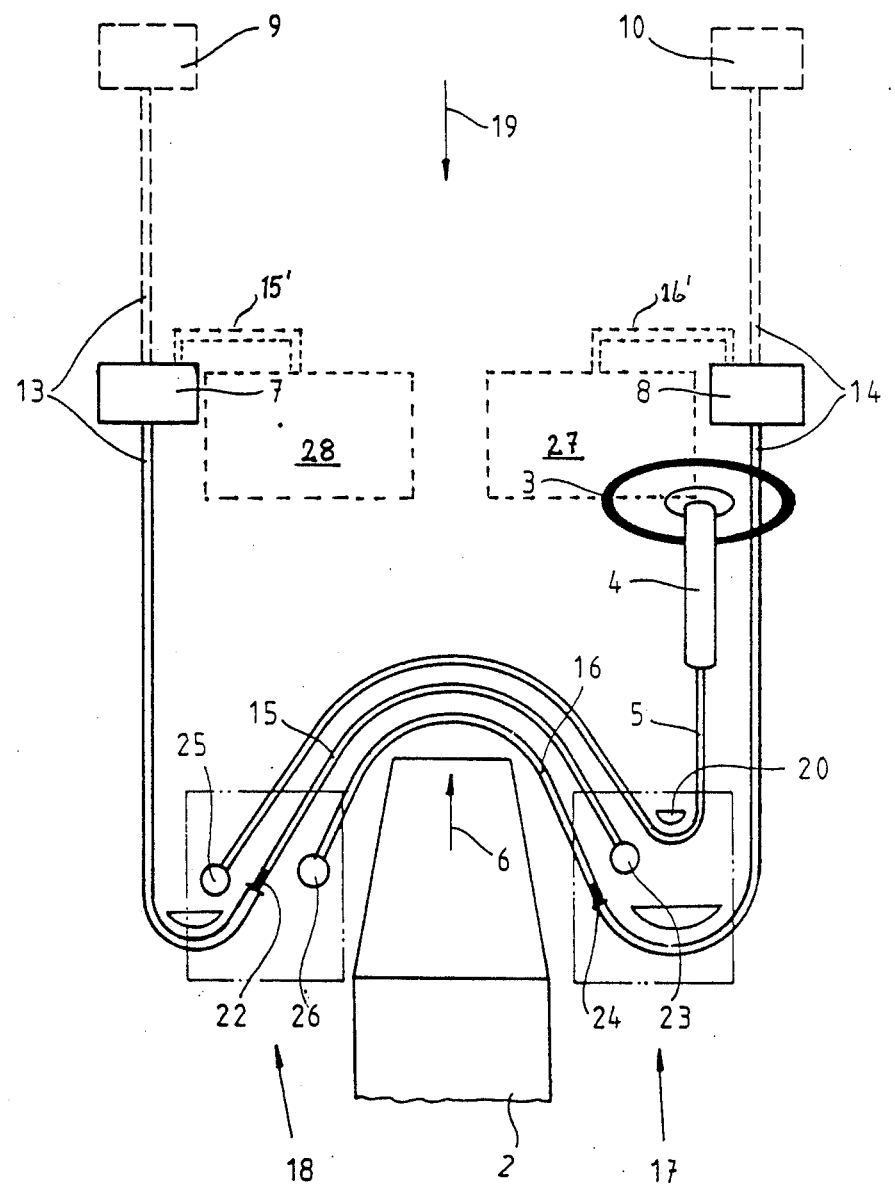
FIG. 1 is a schematic representation of the safety system in accordance with the invention and its manner of operation.

Also shown in FIG. 1 are coiling devices 7 and 8 for seatbelts (30 and 29 (FIG. 2)) associated with a driver seat 27 and a passenger seat 28. Additionally, coiling devices 9 and 10 are depicted in broken lines for seat belts (not shown) to be used at rear seats of the vehicle 1. Cores 15 and 16 of bowden cables 13 and 14, respectively, are connected at least to the front coiling devices 7 and 8, but may additionally branch off to the rear coilign devices 9 and 10 as well. Guide and anchoring means 17 and 18 are positioned to the left and right side of the transmission 2 and are affixed to sections of the chassis (not shown) which even in case of a collision are not likely to collapse or compress. Cable 5 is affixed to a mounting bracket 25 connected to the guide and anchoring block 18 and leads from there, around the rear portion of the transmission 2 and a rail or deflector 20 affixed to the guide and anchoring block 17, to the steering column 4 of a steering wheel 3. The core 16 of bowden cable 14 is connected to a mounting block 26 which is also affixed to the guide and anchoring means 18. The core 16 extends through a sleeve terminal 24 mounted on the guide and anchoring block 17 and from there, through the sleeve, to the coiling means 8 and 10. The core 15 of the cable 13 is affixed to a mounting bracket 23 connected to the guide and anchoring block 17 and extends from there, through a terminal 22 affixed to the block 18 and the sleeve, to the coiling means 7 and 9.

The guide and anchoring block 17 mounted to the left, in the direction of travel (arrow 19), of the transmission 2 is provided with a motion reversing rail 20 for the cable 5 which is affixed to the steering column 4, an anchoring bracket 23 for the core 15 which is in part guided in the right sleeve (13), and a sleeve terminal or nipple 24 by which the core 16 in part guided by the left sleeve 14 exits therefrom. The guide and anchoring block 18 to the right of the transmission 2, as seen in the direction of travel (arrow 19 ), comprises anchoring brackets 25 and 26 for the aforementioned cable 5 and core 16 as well as a nipple 22 for the sleeve 13 from which the core 15 exits.

Thus, the cables 5, 15, and 16 may be seen to extend in parallel to each other, quasi in a harness, and around the rear portion of the transmission 2.

As during movement of the automobile, but also when its engine (not shown) is idling, the transmission 2, owing to its connection with the engine, is subject to certain movements, shocks and vibrations, the cables 5, 15 and 16 are loosely, i.e. with some spacing, slung around the transmission 2. This is done to avoid transfer of cable movements through the cables, which might otherwise occur when the vehicle is subjected to a shock, to the steering column 4 or to the seatbelt coiling devices 7-10. By slinging the cables 5, 15 and 16 around the rear portion of the transmission 2, in the manner depicted and described, a mechanical advantage is obtained in that movement of the transmission 2 by a certain distance in a frontal collision results in movement by the cables 5, 15 and 16 around the rear portion of the transmission 2, as described, notwithstanding.

Figure 2:
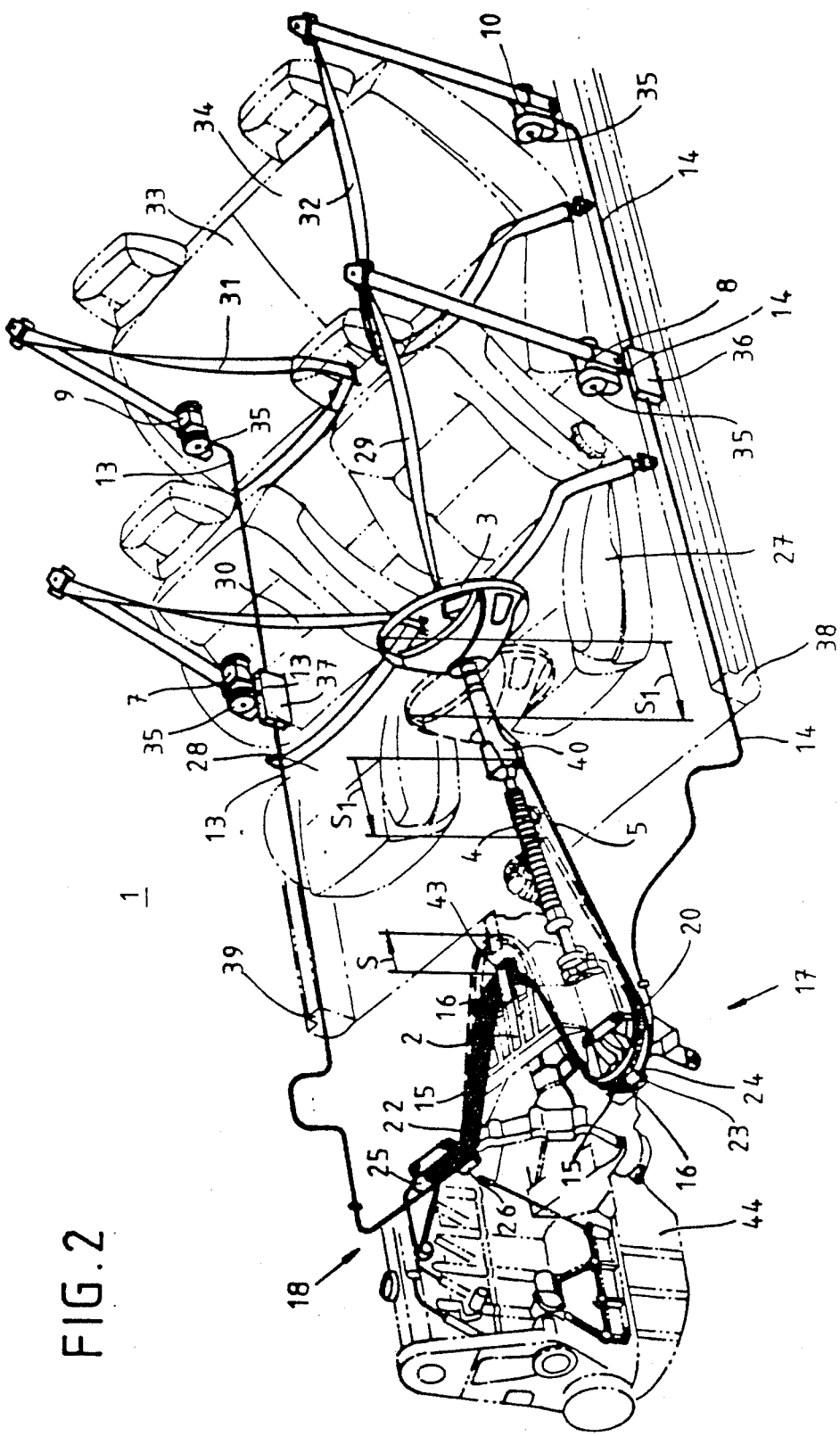
FIG. 2 depicts the forward section of an automotive vehicle with its drive unit and the safety system of the present invention integrated therewith.

FIG. 2 is a schematic presentation of the structure of the entire safety system. As may be seen, both drivers seat 27 and adjacent passenger seat 28 are equipped with lap and shoulder seatbelts 29 and 30, which, in a manner well known in the art, are suspended at three points: one at the closure or buckle and adjacent the center near the floor of the vehicle and two on the door pillar above a person's shoulder and below the seat line, respectively. A substantially similar seatbelt arrangement may be provided for two rear seats 33 and 34. Each of the seatbelts 29-32 is provided with a coiling device 7-10. But for the modification to be described, these coiling devices may be of the conventional kind comprising spring-loaded belt reels providing for spring-loaded extensibility of the seat belts when subjected to gentle pulling forces and for locking of the belts under sudden impact. In accordance with the invention, the safety function of the seatbels 29-32 may be augmented by providing additional tightening or tensioning in case of a collision of the vehicle 1 with some obstruction. This arrangement may be alternatively provided for the front seatbelts 29 and 30 only, or, as shown, for all of the seatbelts 29-32. For this purpose, each oiling device is additionally provided with a cable reel 35 rigidly and coaxially connected with the belt reel. Cables 15 and 16 are partially wound on the reels 35 of the forward coiling devices 7 and 8; and, by way of junctions 36 and 37, extensions of these cables may lead to, and be similarly wound upon, the cable reels 35 of the rear seat belt coiling devices 9 and 10. The cables 15 and 16 are preferably provided with sleeves 13 and 14, in the manner of bowden cables and, as shown, they may in part be installed within the rocker panels 38 and 39 of the chassis.

As mentioned supra, one end of the cable 5 is attached to a bracket or bearing 40 of the column 4 supporting a steering wheel 3. Preferably, the steering column 4 is at least partially corrugated to render it collapsible under certain impact conditions. The other end of the cable 5 leads to the guide and anchoring block 18 as described above.

Preferably, the guide and anchoring blocks 17 and 18 comprise mounting brackets rigidly mounted, as by screw bolts (not shown), to longitudinal frame members (not shown) of the chassis. The cable 5 as well as the cores 15 and 16 are relatively loosely placed around the rear portion of the transmission 2. A mounting clamp 43 may be provided for additionally securing the cables 5, 15 and 16 to the rear portion of the transmission 2 to prevent their unintentional displacment from this position, for this position is of importance to the overall functionality of the system. Positioned ahead of the transmission 2, and mechanically coupled therewith to form a drive unit, is an engine block 44.

If in case of a frontal collision the drive unit is displaced rearwardly by a distance S, the cables 5, 15 and 16 follow suit and assume the positions shown in phantom lines, by a distance $S_1=2S$. The corrugated steering column 4 will be correspondingly deformed or collapsed. At the same time, the cables 15 and 16 acting upon their respective cable reels 35, will tighten or tension the seatbelts 29-32 so that persons retained by them will be thrust forwardly by a lesser distance then they would in the absence of this feature. It goes without saying that the coiling devices 7-10 or the cables 15 and 16 will be provided with appropriate tension limiting means (not shown) to prevent undue tightening of the seatbelts.

As will be appreciated by those skilled in the art, certain advantages may be attained with the safety apparatus in accordance with the invention. By arranging the cables in the manner of a harness in the vicinity of the drive unit the system may be easily installed into a vehicle. Thus, mounting, guidance, and leader devices may be shared in a cost efficient manner. Also, by arranging the symmetrically acting components substantially symmetrically relative to the center line of the vehicle, it is possible to obtain a favorable distribution of the forces and moments. By extending the cables around the rear portion of the drive unit it is possible, by way of a particular advantage, to double the effective movement generated by the cable, even though the forces acting are reduced but still sufficient. This cable movement may then be directly transmitted to such safety features as the steering column bearing, the seatbelt coiling device and the like. It will be appreciated that the forces generated by the cables may, if necessary, be limited by appropriate means for reducing or increasing their effect. Accordingly, it would also be possible to provide for suitable means by which excessive forces could be maintained within, or reduced to, acceptable limits.

In spite of its simple and inexpensive structure the safety system of the present invention offers optimum safety conditions to passengers within a vehicle. Owing to the entirely mechanical coupling by means of cables, malfunctioning of the system is practically eliminated. Moreover, the system may easily be enlarged by adding further safety features. For instance, and as schematically indicated in broken lines, cables $15^1$ and $16^1$ may be branched off from cables 15 and 16 and connected to the front seats 27 and 28 to raise or tilt them backwardly in case of a frontal collision.

Those skilled in the art will appreciate that without departing from the scope and spirit of the invention, certain changes and modifications may be made to the embodiments of the invention set forth, and that all matter described in the specification or shown in the drawings is intended to be illustrative of and not limiting the invention.

What is claimed is:

1. A safety system for automotive vehicles of the kind having a chassis and, in a forward section thereof, a drive unit having a rear portion and being displaceable rearwardly relative to said chassis when impacted by a frontal collision exceeding a predetermined force, comprising:

first and second guiding and anchoring means mounted on substantially non-collapsible sections of said chassis at opposite sides and forwardly of said rear end portion of said drive unit, each of said guiding and anchoring means comprising a mounting bracket and motion reversal means;

a plurality of safety means actuated by a pulling force;

guide means mounted on said drive unit substantially rearwardly of said rear end portion;

a plurality of flexible and substantially inextensible elongate means for transmitting rearward displacement of said drive unit as said pulling force to said safety means, each of said elongate means having a first end connected to said bracket of one of said first and second guiding and anchoring means, a second end connected to one of said plurality of safety means, and an intermediate section engaged by the motion reversal means of the guiding and anchoring means opposite the guiding and anchoring means of the bracket to which said first end is connected;

said plurality of elongate means, for generating a mechanical advantage during rearward movement of said drive unit, extending substantially in parallel to each other around said rear end portion of said drive unit and being slideably supported by said guide means.

2. The system of claim 1, wherein each of said plurality of elongate means comprises a cable.

3. The system of claim 2, wherein said cable comprises a bowden cable including a core and a sleeve, opposite ends of the core of which are connected to a bracket and a safety means.

4. The system of claim 3, wherein said motion reversal means comprises means for anchoring opposite ends of said sleeve, said core extending beyond said anchoring means.

5. The system of claim 4, wherein said core extends outside of said sleeve between said bracket and said anchoring means.

6. The system of claim 5, wherein said safety means comprises coiling means for lap and shoulder seatbelts of front seats of said vehicle, each coiling means being provided with reel means connected to one end of said core.

7. The system of claim 6, wherein said bowden cable is provided with branch means one end of the core of which is connected to reel means of coiling means for lap and shoulder seatbelts of rear seats of said vehicle.

8. The system of claim 7, wherein said bowden cable is mounted to extend in part along rocker panel means of said vehicle.

9. The system of claim 3, wherein said bowden cables extend extend around said rear end portion of said drive means in alternating directions.

10. The system of claim 9, wherein said bowden cables extend around said rear end portion of said drive unit at a predetermined spacing relative thereto.

11. The system of claim 5, wherein said safety means comprises means for lifting seats in said vehicle.

12. The system of claim 2, wherein said safety means comprises a collapsible steering column supported by bearing means.

13. The system of claim 12, wherein said bearing means is connected to one end of a cable, the other end of which is connected to a bracket of one of said mounting means, said cable having an intermediate section engaged by a motion reversal means on the other of said mounting means and extending around said rear portion of said drive unit and being retained in its position by said guide means.

14. The system of claim 13, wherein said motion reversal means comprises guide means for reversing the direction of said cable.

15. The system of claim 14, wherein said cable is spaced from said drive unit at a predetermined distance.

16. The system of claim 9, wherein said cables are arranged as a harness comprising at least three cables and wherein one of said plurality of safety means comprises collapsible steering column means and two of said plurality of safety means comprises coiling means of seatbelts.

17. The system of claim 16, wherein one of said seatbelt coiling means is connected to a cable extending in a first direction and the other seatbelt coiling means is connected to a cable extending in a direction opposite said first direction.

* * * * *